United States Patent [19]
Miyazaki et al.

[11] Patent Number: 5,759,425
[45] Date of Patent: Jun. 2, 1998

[54] HONEYCOMB CORE DEGREASING METHOD

[75] Inventors: Yosuke Miyazaki; Koji Ogai, both of Kakamigahara, Japan

[73] Assignee: Kawasaki Jukogyo Kabushiki Kaisha, Hyogo-Ken, Japan

[21] Appl. No.: 708,601

[22] Filed: Sep. 5, 1996

[30] Foreign Application Priority Data

Sep. 6, 1995 [JP] Japan .................. 7-0254602

[51] Int. Cl.$^6$ .................................................. C23K 3/00
[52] U.S. Cl. ............................................................. 216/77
[58] Field of Search .............................................. 216/77

[56] References Cited

U.S. PATENT DOCUMENTS

| | | |
|---|---|---|
| 3,284,891 | 11/1966 | Whitney . |
| 4,271,219 | 6/1981 | Brown . |
| 4,339,283 | 7/1982 | McCord . |
| 4,844,743 | 7/1989 | Koblenzer et al. . |

FOREIGN PATENT DOCUMENTS

| | | |
|---|---|---|
| A-5-121389 | 5/1993 | Japan . |
| A-6-248294 | 9/1994 | Japan . |
| A-7-74136 | 3/1995 | Japan . |
| 470419 | 8/1937 | United Kingdom . |
| 1097297 | 1/1968 | United Kingdom . |
| 2-113-719 | 8/1983 | United Kingdom . |

Primary Examiner—Deborah Jones
Attorney, Agent, or Firm—Oliff & Berridge, PLC

[57] ABSTRACT

For degreasing a honeycomb core, the honeycomb core is placed in a degreasing chamber, which is then closed. The degreasing chamber is thereafter evacuated to a vacuum in the range of 50 to 100 torr, and the upper and lower surfaces of the honeycomb core are sprayed with a normal paraffin as a hydrocarbon cleaning agent heated at a temperature of from 60° to 120° C. for shower rinsing and finish shower rinsing. The internal pressure of the degreasing chamber is adjusted to a vacuum in the range of 30 to 40 torr, and a vapor of the normal paraffin cleaning agent heated at a temperature in the range of 110° to 120° C. is supplied into the degreasing chamber for vapor degreasing of the honeycomb core. Finally, the honeycomb core is dried in the degreasing chamber at a temperature of from 70° to 120° C. under a reduced pressure in the range of 0.1 to 10 torr. The above method degreases a honeycomb core with a satisfactory cleanliness, ensuring high bond strength and high durability of bonds. The method is unhazardous to environment.

1 Claim, 5 Drawing Sheets

HONEYCOMB CORE DEGREASING METHOD

BACKGROUND OF THE INVENTION

1. Field of the Invention

The present invention relates to a honeycomb core degreasing method for degreasing a honeycomb core for a honeycomb sandwich structural material before being sandwiched between outer sheets.

2. Description of the Related Art

A basic honeycomb sandwich structural material is constructed by laminating and bonding a honeycomb core, i.e., a core member, between two outer sheets. A honeycomb sandwich structural material for aircraft and space craft has outer sheets and a metallic honeycomb core. The outer sheets are made of a metal, such as an aluminum alloy or a titanium alloy, a synthetic resin, such as a GFRP, CFRP, AFRP OR BFRP, or a composite resin material, such as a fiber-reinforced composite material. The metallic honeycomb core is made of aluminum alloy or a nonmetallic honeycomb core of glass, aramid fibers or the like.

The outer sheets are bonded to the honeycomb core with an adhesive film of a thermosetting epoxy resin that sets at 250° C. or 350° C. The outer sheets and the honeycomb core must be cleaned by a cleaning process before a bonding process to ensure the firm adhesion of the outer sheets and the honeycomb core and satisfactory durability of bonds because the adhesion of the outer sheets and the honeycomb core is primary or secondary structural adhesion and the strength and the durability of structures are greatly dependent on the adhesive performance and the durability of bonds.

A pretreatment process for adhesive bonding the outer sheets uses vapor degreasing, etching, anodizing or blasting, and, when necessary, an adhesive primer is applied to the surfaces of the outer sheets and bake cured. A pretreatment process for adhesive bonding the honeycomb core uses solvent cleaning when the honeycomb core is made of a nonmetallic material or vapor degreasing when the honeycomb core is made of a metal. When assembling the honeycomb core and the outer sheets by adhesive bonding, the outer sheets are bonded to the honeycomb core with an adhesive film, to construct a honeycomb sandwich structure, and then the honeycomb sandwich structure is pressured and heated to harden the adhesive film.

Incidentally, most metal honeycomb cores are aluminum alloy honeycomb cores. An aluminum alloy honeycomb core is formed by partially bonding together aluminum alloy foils in a laminated structure and expanding the laminated structure to form a honeycomb core. The honeycomb core thus formed by expanding the laminated structure has bonds, which is called node bonds, and, in most cases, the honeycomb core is of a hexagonal cell type having hexagonal cells. Some honeycomb cores are of a square cell type, an overexpanded type or an open cell type, i.e., a core formed by stacking and bonding together corrugated ribbons.

A conventional pretreatment process for cleaning an aluminum alloy honeycomb core before a bonding process carries out open-space degreasing using a chlorinated solvent, such as trichloroethane, or closed-space vapor degreasing. The use and production of trichloroethane has been prohibited by law since the end of 1995 for the conservation of the ozonosphere because trichloroethane is a substance that destroys the ozonosphere.

Prior art techniques relating to the field to which the present invention is related are disclosed in JP-A Nos. 5-121389, 6-248294 and 7-74136.

When an aluminum alloy honeycomb core is degreased by using an aqueous degreasing agent, water and the degreasing agent are liable to remain on the edge or faying recess of the aluminum alloy honeycomb core due to the surface tension of water and the degreasing agent, so that the degreasing agent attacks and harms the honeycomb core. Therefore, it is inappropriate to use an aqueous degreasing agent as a substitute for trichloroethane and such an aqueous degreasing agent has not been used for degreasing. Currently, returning back to an old process, only a vapor degreasing process employing trichloroethylene or tetrachloroethylene is used for degreasing the aluminum alloy honeycomb core. However, the vapor degreasing process using trichloroethylene is hazardous to operator's health and has the possibility of entailing soil contamination, and hence many legal restrictions are imposed on the vapor degreasing process.

The performance of the pretreatment process for cleaning the aluminum alloy honeycomb core before a bonding process affects the performance of a honeycomb sandwich panel in the following respects.

(1) The application of an adhesive primer to the surface of the aluminum alloy honeycomb core.

(2) The adhesion of the aluminum alloy honeycomb core and outer sheets (formation of fillets of the adhesive).

(3) The adhesion of spliced aluminum alloy honeycomb cores (adhesion of the butt joint of aluminum alloy honeycomb cores).

(4) Filling aluminum alloy honeycomb cores with a resin.

If aluminum alloy honeycomb cores are not cleaned and contaminated, a honeycomb sandwich structure constructed by sandwiching the aluminum alloy honeycomb core between outer sheets does not have a necessary strength, and the outer skins of the honeycomb sandwich structure may be separated from each other. Accordingly, it is important to improve the performance of the pretreatment process for cleaning aluminum alloy honeycomb cores.

SUMMARY OF THE INVENTION

It is an object of the present invention to provide a honeycomb core degreasing method for degreasing a honeycomb core before a bonding process, which is capable of degreasing an aluminum alloy honeycomb core with a satisfactory cleanliness to ensure high bond strength and high durability of bonds, and which is unhazardous to the operators and the environment.

The inventors of the present invention made studies of aqueous decreasing methods using an aqueous degreasing agent and solvent degreasing methods using an organic solvent.

An aqueous degreasing method uses an aqueous solution containing an alkaline salt or a surface active agent as a principal component, immerses a workpiece in the aqueous solution or sprays a workpiece with the aqueous solution, the aqueous solution being of a temperature not lower than the cloud point. The aqueous degreasing method was found to be unsuitable for degreasing aluminum alloy honeycomb cores. When an aluminum alloy honeycomb core is degreased by an aqueous degreasing method, the strength of bonds (node bonds) adhesively bonding together aluminum foils was reduced due to the moisture absorption of the adhesive, and aluminum alloy honeycomb cores cleaned by the aqueous degreasing method were corroded during manufacture or during use by residual alkaline salts and moisture remaining in the aluminum alloy honeycomb cores.

Aluminum alloy honeycomb cores were cleaned by solvent degreasing methods respectively using hydrocarbon solvents, such as NMP, a normal paraffin, an isoparaffin and a napthene, water base solutions, such as aqueous solutions containing an alcohol as a principal component, water and a surface active agent, halides, alcohols and ketones, and the effects of the solvent degreasing methods were evaluated on the basis of criteria tabulated in Table 1 below. The results of evaluation are tabulated in Table 2 below. It was found through the examination of the results of evaluation shown in Table 2 that a normal paraffin cleaning agent (NS CLEAN 200, trade name of a cleaning agent produced by NIKKO PETROCHEMICALS CO., LTD., Japan) is practically applicable to degreasing aluminum alloy honeycomb cores before a bonding process.

TABLE 1

| | Test Quality | Test Item | Test Method (Note 3) | Criteria | Remarks |
|---|---|---|---|---|---|
| 1 | Degreasing Performance | Cleanliness | Contaminate a sample core degreased by vapor degreasing with oil, clean the contaminated sample core by immersion cleaning, dry the cleaned sample core, and measure the quality of residual oil. (Note 1) | Equivalent to trichloroethan | Note 1) Contaminating Oil: Lubrication oil for honeycomb core fabrication machine |
| | | Dryness | Measure residual degreasing agent by FT-IR. Dry the sample at 130° C. for 30 min. Use an evaporated gold surface as a reference surface. | Not to detect molecular bond of degreasing agent | Note 2) |
| 2 | Effect on Workpiece | Effect on Surface Coating | Immerse the sample core in a degreasing agent for 3 hr. and heat the sample core at 170° C. for 3 hr. Subject the sample to a salt water spray test (ASTM B117) for 720 hr. Observe the appearance of the sample core and measure weight loss (MIL-C-7438G, Core corrosion test). | Equivalent to trichloroethan in corrosion and weight loss | Adhesive: AF163-2K Adhesive Primer: EC3960 Cure: As specified by maker Note 3) |
| | | Effect on Node Bond Strength | Immerse a sample core degreased by vapor degreasing in a degreasing agent for 3 hr., dry at 100° C. for 30 min. and subject the sample core to strength test (MIL-C-7438G, Delamination test). The blank is not subjected to heating, such as drying. | Equivalent to trichloroethan | Sample honeycomb core 5.7-3/16-20N(5056) MIL-C-7438 HEXCEL CR III |
| 3 | Bond Quality | Honeycomb Panel Drum Peel Strength Test | Degrease a sample core as procured by immersing the same in the degreasing agent for 3 min. or by spray degreasing, dry the degreased sample core at 100° C. for 30 min., construct a honeycomb sandwich panel using the sample core. Subject the honeycomb sandwich panel to strength test (ASTM D1781). (Note 2) | Equivalent to trichloroethan | |
| | | Bond Durability Test | Clean and dry the degreased sample aluminum plate, bond the sample aluminum plate, subject the bonded sample aluminum plate to wedge test (ASTM D3726). | Equivalent to trichloroethan | |
| 4 | Chemical Property | Chemical Analysis of Halides | Chemical analysis (MIL-T-81533) | pH: 5.0–10.5 Not less than 0.06 wt % | |

TABLE 2

| | Degreasing agent | Cleanliness | Dryness | Effect on the Surface Coating | Effect on the Strength of Node Bond | Drum Peel Strength Test | Bond Durability Test | Overall Judgement | Remarks |
|---|---|---|---|---|---|---|---|---|---|
| 1 | N-methyl-2-pyrolidone | O | Not measured | — | X | O | — | X | Note 1) |
| 2 | Normal paraffin | O | Not measured | O | O | O | O | O | O: Equivalent to 1.1.1-trichloroethan X: Inferior to 1.1.1-trichloroethan Note 2) |
| 3 | Isoparaffin | O | Not measured | X | X | X | — | X | Result of chemical analysis of halide degreasing agent (only for bromide) Not satisfy the criteria for pH |
| 4 | Naphthene | O | Not measured | X | O | O | — | X | |
| 5 | Quasi-aqueous hydrocarbon | X | Not Measured | X | O | X | — | X | |

TABLE 2-continued

|   | Degreasing agent | Cleanliness | Dryness | Effect on the Surface Coating | Effect on the Strength of Node Bond | Drum Peel Strength Test | Bond Durability Test | Overall Judgement | Remarks |
|---|---|---|---|---|---|---|---|---|---|
| 6 | Bromide hydrocarbon | O | Not measured | — | — | — | — | X | Note 2) |
| 7 | Isopropyl alcohol | X | Not measured | — | O | O | O | | |
| 8 | Methyl-ethyl ketone | O | Not measured | — | X | O | O | | |
| 9 | 1.1.1-trichloroethane | O | Not measured | O | O | O | O | — | |
| 10 | Blank (not degreased) | — | Not measured | — | O | — | — | — | |

The present invention has been made on the basis of such findings obtained through the examination of those results of evaluation and provides a honeycomb core degreasing method employing a vacuum spraying vapor cleaning process using a normal paraffin as a hydrocarbon cleaning agent, and capable of degreasing honeycomb cores more satisfactorily than the conventional honeycomb core degreasing method employing a vapor degreasing process using trichloroethane or trichloroethylene.

According to the present invention, a honeycomb core degreasing method comprises the steps of placing a honeycomb core in a degreasing chamber, closing the degreasing chamber, evacuating the degreasing chamber to a vacuum in a range of 50 to 100 torr, spraying upper and lower surfaces of the honeycomb core with a normal paraffin as a hydrocarbon cleaning agent heated at a temperature in a range of 60° to 120° C. for shower rinsing and finish shower rinsing, adjusting an internal pressure of the degreasing chamber to a vacuum in a range of 30 to 40 torr, supplying a vapor of the normal paraffin cleaning agent heated at a temperature in a range of 110° to 120° C. into the degreasing chamber for a vapor degreasing of the honeycomb core, and drying the honeycomb core in the degreasing chamber at a temperature in a range of 70° to 120° C. under a reduced pressure in a range of 0.1 to 10 torr.

The honeycomb core degreasing method of the present invention evacuates the degreasing chamber to a vacuum in the range of 50 to 100 torr to avoid the temperature to rise near to the boiling point of the normal paraffin cleaning agent when temperature distribution in the degreasing chamber is irregular and to promote the penetration of the normal paraffin cleaning agent into gaps in the honeycomb core.

The higher the pressure of the degreasing chamber or the lower the temperature of the degreasing chamber, the longer is the time necessary for drying the honeycomb core. Therefore, the drying step, i.e., the final process is carried out at a vacuum in the range of 0.1 to 10 torr and a temperature in the range of 70° to 120° C. The allowable pressure range and the allowable temperature range were determined on the basis of a drying time practically allocatable to the drying step. The upper limit of the allowable temperature range was set to 120° C. taking into consideration the resistance to heat of the node bonds and so on of honeycomb cores.

DESCRIPTION OF THE PREFERRED EMBODIMENTS

Preferred embodiments of the present invention will be understood from the following detailed description made with reference to the accompanying drawings.

The method of degreasing a honeycomb core according to the present invention uses a normal paraffin as a hydrocarbon cleaning agent that is sprayed in a closed degreasing chamber in which the honeycomb core is placed. Steps of the degreasing method are all carried out in the closed degreasing chamber and hence there is no danger of fire. Since the flash point of the normal paraffin cleaning agent is 70° C., there is a high possibility of fire when the normal paraffin cleaning agent is sprayed for shower cleaning and the degreased honeycomb core is dried in an open space because a mist of the normal paraffin cleaning agent is liable to form under such conditions. There is no possibility of fire when the honeycomb core is subjected to shower cleaning and drying in the closed degreasing chamber.

The honeycomb core degreasing method of the present invention subjects the two major surfaces of a honeycomb core to a shower rinsing process and a finish rinsing process using the normal paraffin cleaning agent of a temperature in the range of 60° to 120° C. in the degreasing chamber evacuated to a vacuum in the range of 50 to 100 torr, whereby inner surfaces of the honeycomb core can perfectly be degreased. Since the honeycomb core constructed by partially bonding together foils has a small heat capacity, mineral oils contaminating a honeycomb core cannot completely be removed to a degree at which no residual mineral oil can be detected by ultraviolet inspection using ultraviolet radiation for detecting residual oils by a single vapor degreasing cycle of the conventional honeycomb core degreasing method using trichloroethylene. The honeycomb core degreasing method of the present invention uses the normal paraffin as a hydrocarbon cleaning agent of a temperature in the range of 60° to 120° C., at which the normal paraffin cleaning agent is able to remove (dissolve) mineral oils contaminating the honeycomb core efficiently, and evacuates the degreasing chamber to a vacuum of 50 to 100 torr, at which the normal paraffin cleaning agent can be supplied at an appropriate rate into the degreasing chamber. Consequently, the inner portions of the honeycomb core can completely be degreased. The honeycomb core degreasing method of the present invention is effectively applicable to degreasing a honeycomb core with an outer sheet adhesively attached to one major surface thereof.

Figure 5:
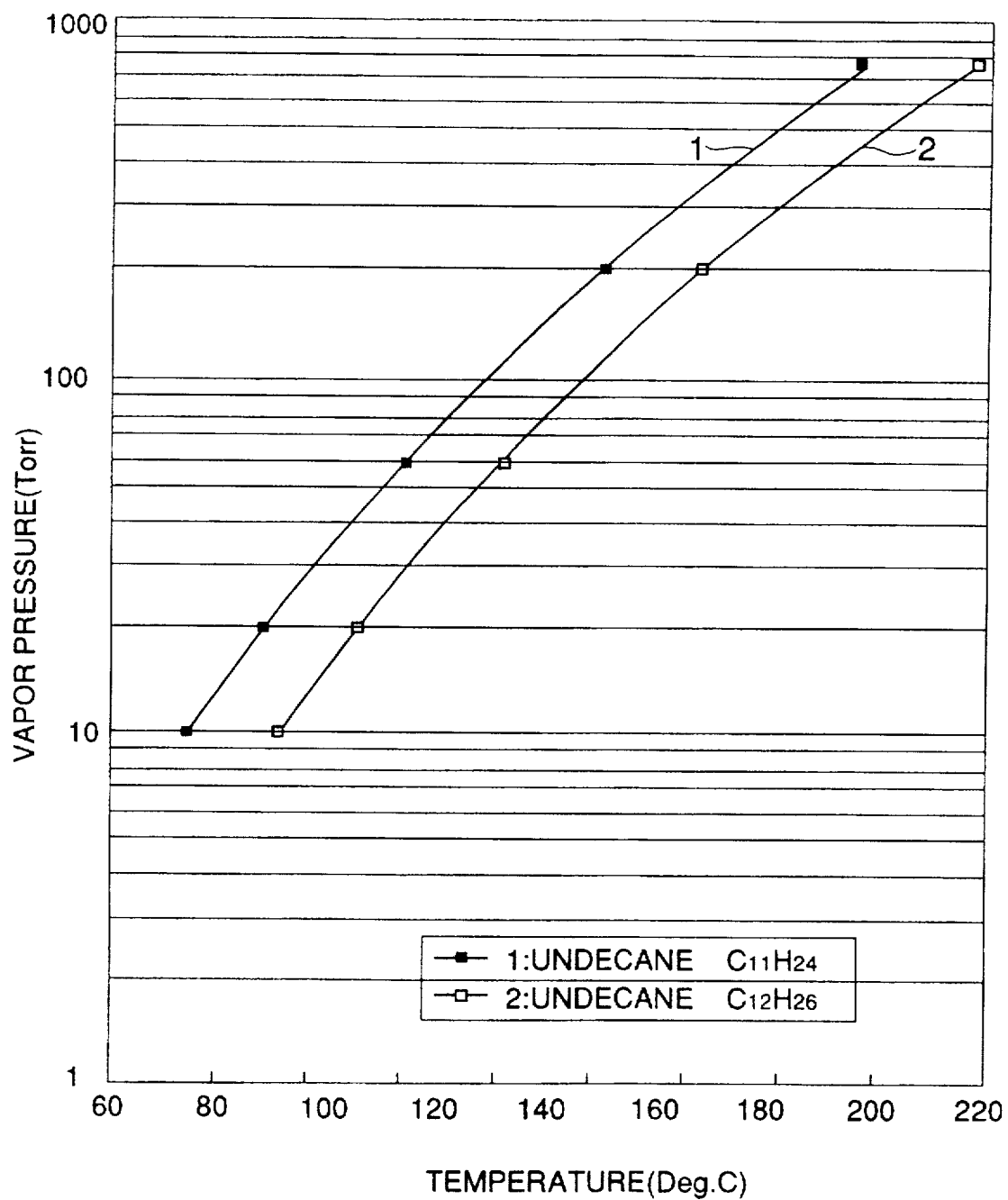
FIG. 5 is a graph showing variations of the vapor pressures of normal paraffins with temperature.

The honeycomb core degreasing method of the present invention adjusts the internal pressure of the degreasing chamber to a vacuum in the range of 30 to 40 torr after a shower rinsing process and a finish shower rinsing process have been completed, and then supplies a vapor of the normal paraffin cleaning agent of a temperature in the range of 110° to 120° C. into the degreasing chamber for vapor degreasing. Such degreasing steps are effective in enhancing the effect of finish cleaning and promoting drying. The normal paraffin cleaning agent has a boiling point and a flash point very close to the boiling point at the normal pressure and hence the normal paraffin cleaning agent cannot be used for vapor degreasing at the normal pressure. However, the normal paraffin cleaning agent can be used for vapor degreasing at a reduced pressure because the boiling point of the normal paraffin cleaning agent decreases when the pressure is reduced. When the cleaning temperature is set to 120° C., which is equal to a temperature at which the honeycomb core and outer sheets are heated when bonding the outer sheets to the honeycomb core, in view of the resistance to heat of the honeycomb core, the vapor degreasing of the honeycomb core for finish cleaning can properly be accomplished without leaving any residual oils when the degreasing chamber is evacuated to a vacuum in the range of 30 to 40 torr, which is understood from FIG. 5, and the subsequent drying can be promoted.

The honeycomb core degreasing method of the present invention carries out the drying process, i.e., the final process, at a reduced pressure in the range of 0.1 to 10 torr and at a temperature in the range of 70° to 120° C., the normal paraffin cleaning agent remaining on the honeycomb core can completely be removed and satisfactory drying can be achieved.

Thus, the honeycomb core degreasing method of the present invention degreases a honeycomb core with a satisfactory cleanliness, and ensures sufficient bond strength, durability of bonds and safety for the operator and the environment.

A honeycomb core degreasing apparatus for carrying out the honeycomb core degreasing method of the present invention will be described prior to the description of the honeycomb core degreasing method.

Figure 1:
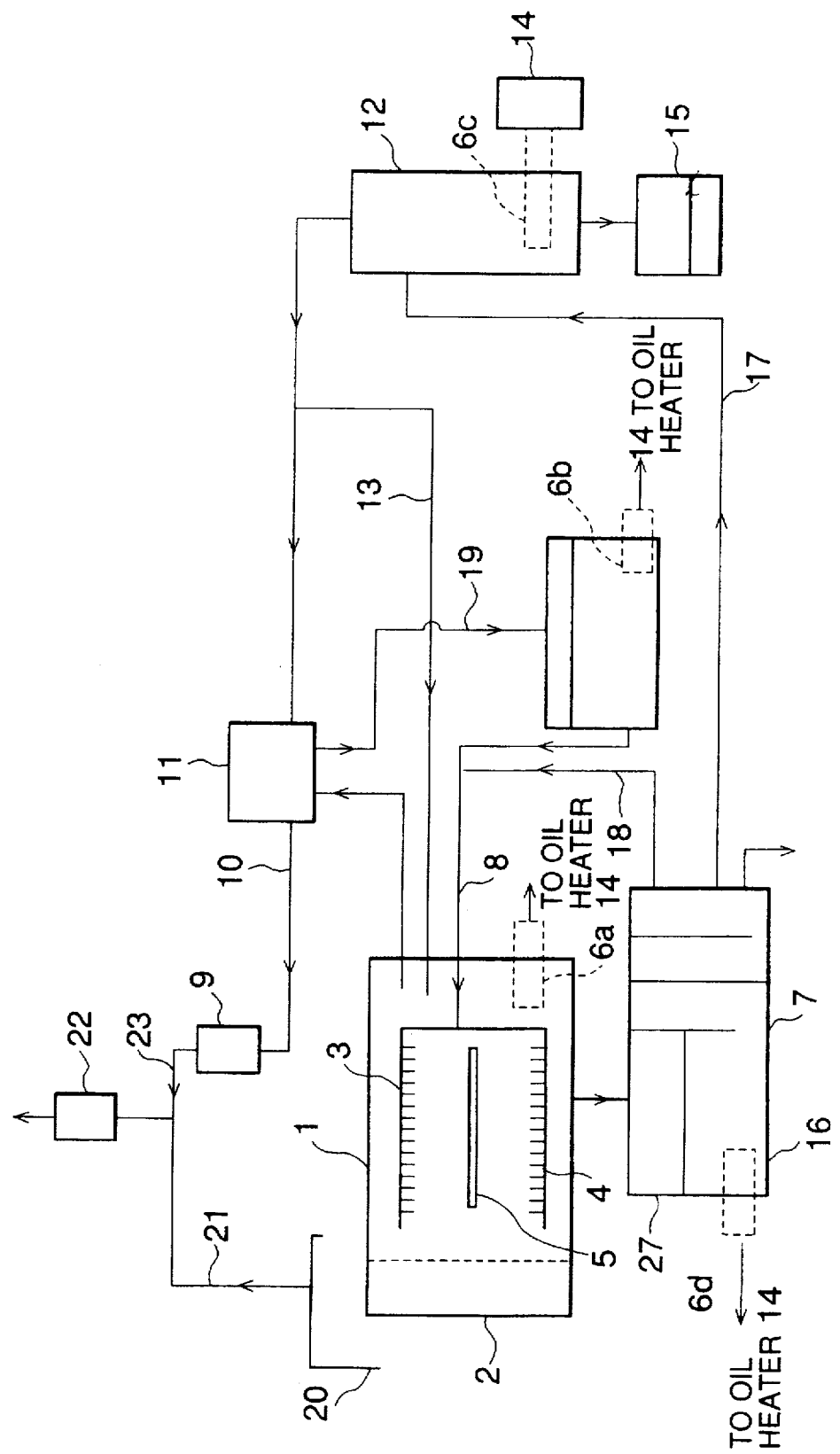
FIG. 1 is a block diagram of a honeycomb core degreasing apparatus for carrying out a honeycomb core degreasing method in accordance with the present invention.

Referring to FIG. 1, a degreasing vessel 1 defining a degreasing chamber has a door 2 on its left end, as viewed in FIG. 1, upper shower nozzles 3 for spraying a normal paraffin degreasing agent on the upper surface of a honeycomb core are disposed in an upper portion of the degreasing chamber, and lower shower nozzles 4 for spraying the degreasing agent on the lower surface of the honeycomb core are disposed in a lower portion of the degreasing chamber. A holder 5 for holding the honeycomb core is disposed in the central portion of the degreasing chamber. The upper shower nozzles 3 and the lower shower nozzles 4 are full-cone nozzles disposed with their axes in parallel to the direction of the width of a honeycomb core held on the holder 5. The shower nozzles 3 and 4 are arranged so that a cleaning area of 3700 mm by 1700 mm is substantially uniformly sprayed with the degreasing agent in substantially the same flow density. A heat exchanger 6a for heating the degreasing chamber is provided in the lower righthand portion of the degreasing chamber.

The upper shower nozzles 3 and the lower shower nozzles 4 are connected via a degreasing agent supply line 8 to a reservoir tank 7 containing the degreasing agent and to a return tank 16. A heat exchanger 6b is disposed in the reservoir tank 7 to regulate the temperature of the degreasing agent. A vacuum pump 9 is connected to the degreasing vessel 1 by a suction line 10 to evacuate the degreasing chamber. A condenser 11 is placed in the suction line 10. An evaporator 12 is connected to the degreasing vessel 1 via a vapor supply line 13 to supply the vapor of the degreasing agent into the degreasing chamber. A heat exchanger 6c is placed within the evaporator 12 and connected to an oil heater 14. A drain tank 15 is connected to the evaporator 12. The degreasing agent supplied into and used in the degreasing chamber of the degreasing vessel 1 is returned to a return tank 16. The return tank 16 is connected to the evaporator 12 via a regeneration line 17 and to the degreasing agent supply line 8 via a return line 18. Another heat exchanger 6d is placed in the return tank 16 to regulate the temperature of the degreasing agent contained in the return tank 16.

A heating oil heated by the oil heater 14 is supplied to the heat exchangers 6a, 6b and 6d placed in the degreasing vessel 1, the reservoir tank 7 and the return tank 16, respectively, to regulate the respective temperatures of the degreasing vessel 1, the reservoir tank 7 and the return tank 16. The degreasing agent condensed by the condenser 11 is returned through a return line 19 to the reservoir tank 7.

If necessary, an exhaust hood 20 may be disposed above the door 2 of the degreasing vessel 1 to enable the use of trichloroethylene for degreasing. The vented hood 20 is connected via a duct 21 to an exhaust device 22.

Figure 2:
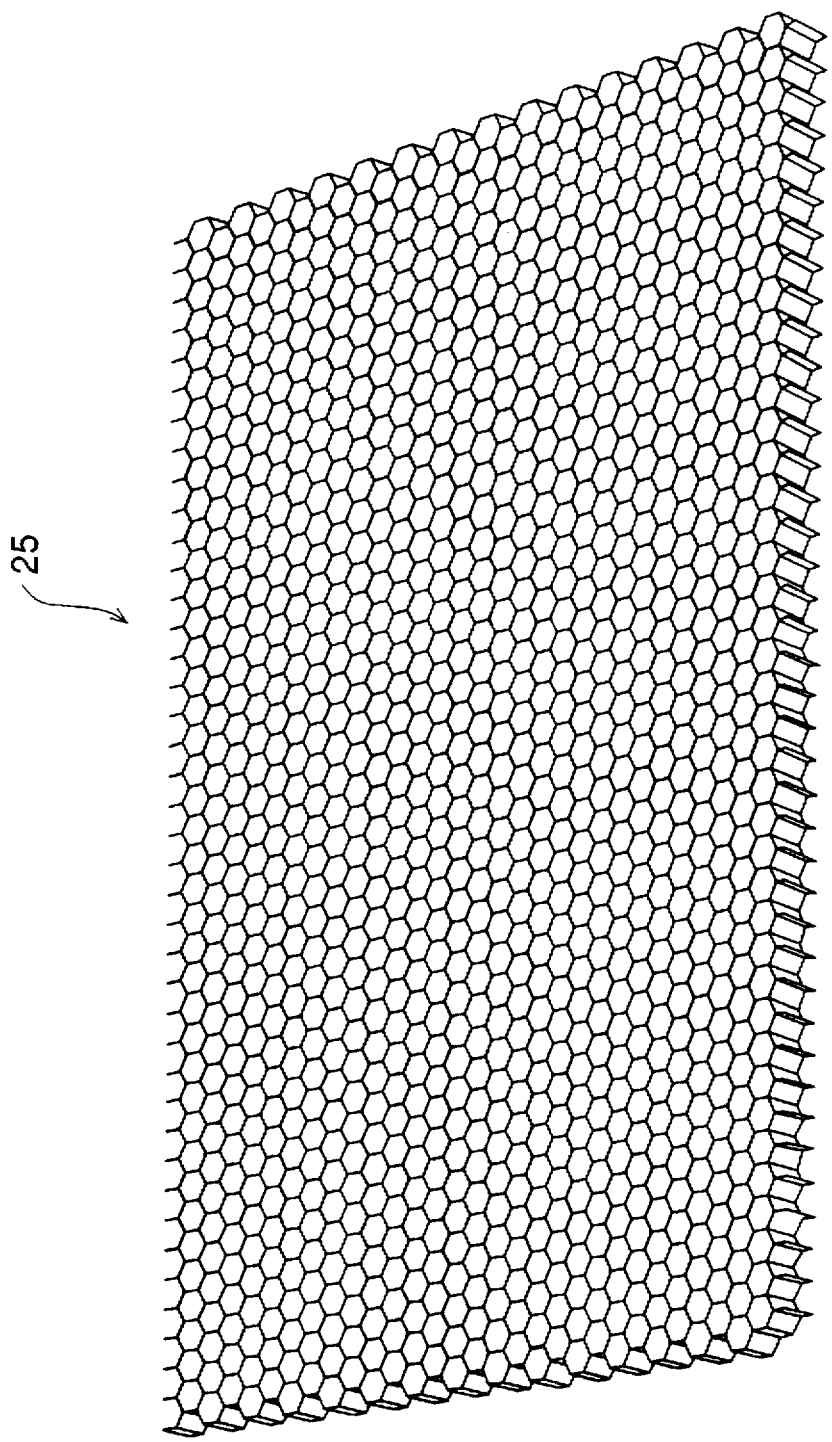
FIG. 2 is a perspective view of an aluminum alloy honeycomb core having hexagonal cells to be degreased by the honeycomb core degreasing apparatus of FIG. 1.
Figure 3:
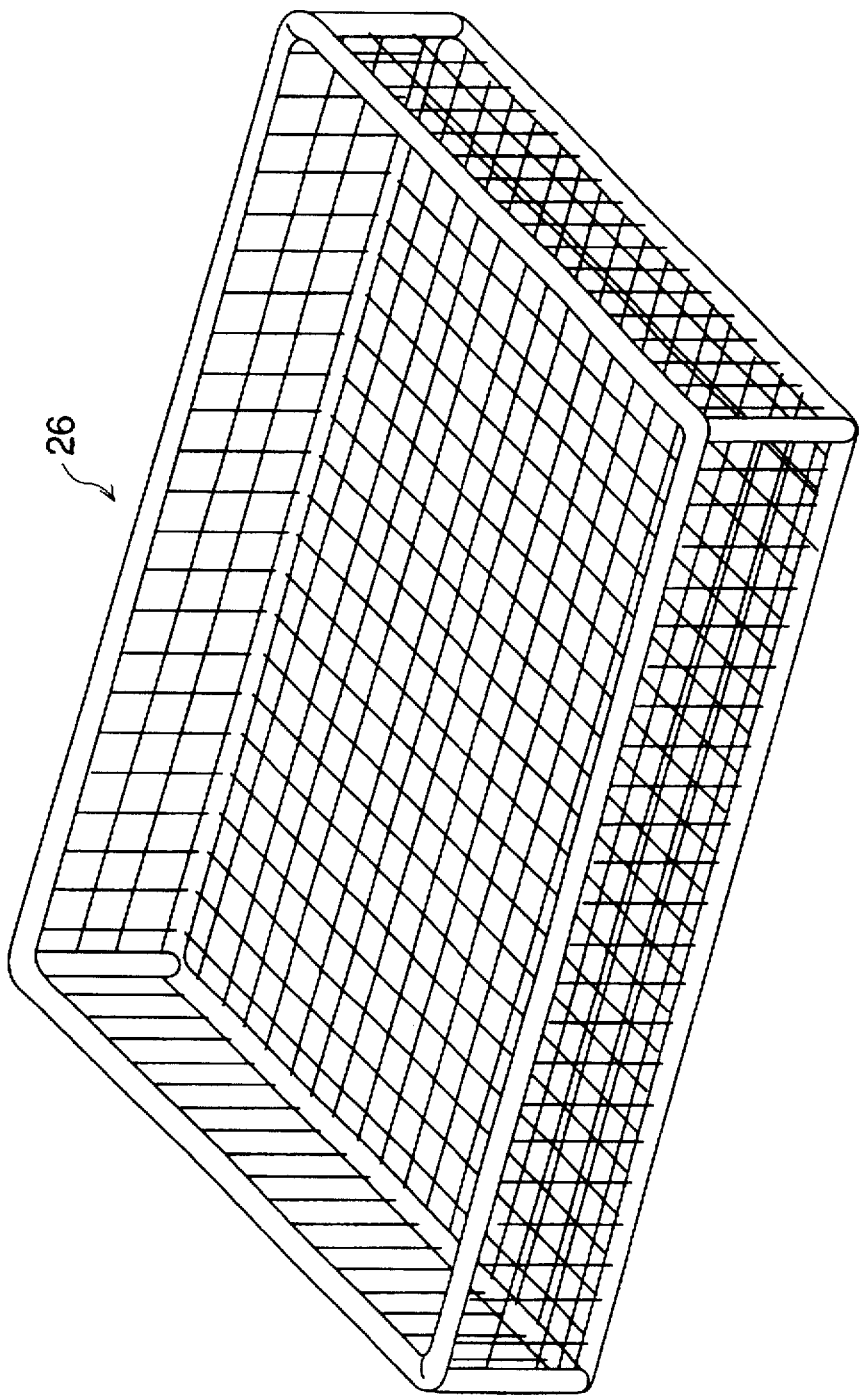
FIG. 3 is a perspective view of a basket for containing a honeycomb core during degreasing.

An example of the honeycomb core degreasing method according to the present invention to be carried out by the thus constructed honeycomb core degreasing apparatus will be described below. A hexagonal cell type aluminum alloy honeycomb core 25 of 3500 mm in length, 1600 mm in width, 100 mm in thickness and 6 mm in cell size as shown in FIG. 2 was placed in a stainless steel basket 26 of 3700 mm in length, 1700 mm in width and 150 mm in depth as shown in FIG. 3. The door 2 was opened, the basket 26 containing the aluminum alloy honeycomb core 25 was carried into the degreasing chamber in the degreasing vessel 1 by a truck, and the basket 26 was held on the holder 5 disposed in the central portion of the degreasing chamber. Gases discharged from the degreasing vessel 1 were discharged through the exhaust hood 20 and the duct 21 by the exhaust device 22. Subsequently, the door 2 was closed, the degreasing chamber 1 was evacuated through the suction line 10 by the vacuum pump 9 to a vacuum of 100 torr. Then, the degreasing chamber was heated at 70° C. by the heat exchanger 6a. A normal paraffin degreasing agent 27 containing a hydrocarbon having a carbon number of 11 or 12 as a principal component (for example, NS CLEAN 200, trade name of a degreasing agent produced by NIKKO PETROCHEMICALS CO., LTD., Japan) is supplied from the return tank 16 through the supply lines 18 and 8 to the upper shower nozzle 3 and the lower shower nozzles 4, and the normal paraffin degreasing agent 27 was sprayed on the upper and the lower surfaces of the honeycomb core 25 for 7 minutes for shower rinsing. Subsequently, a fresh degreasing agent was supplied from the reservoir tank 7 through the supply line 8 to the upper shower nozzles 3 and the lower shower nozzles 4 and sprayed on the upper and lower surface of the honeycomb core 25 for 20 seconds for finish shower rinsing. Then, the degreasing chamber was evacuated to 40 torr, the normal paraffin degreasing agent 27 was heated at 120° C. in the evaporator 12 by the oil heater 14 to produce a vapor of the normal paraffin degreasing agent 27, and the vapor of the normal paraffin degreasing agent 27 of 120° C. was supplied through the vapor supply line 13 into the degreasing chamber to remove oils remaining on the honeycomb core 25 completely. Subsequently, the pressure in the degreasing chamber was adjusted to 1 torr, and then the honeycomb core 25 was dried at 100° C. for 4 minutes.

The used normal paraffin degreasing agent 27 collected on the bottom of the degreasing vessel 1 was returned to the return tank 16 and filtered in the return tank 16. Part of the filtered normal paraffin degreasing agent 27 was sent through the line 17 to the evaporator 12 and the rest of the filtered normal paraffin degreasing agent 27 was supplied through the return line 18 to the supply line 8 to use the same agin for shower rinsing. The vapor of the normal paraffin degreasing agent contained in the gas sucked by the vacuum pump 9 to regulate the vacuum of the degreasing chamber was condensed by the condenser 11, and the condensed normal paraffin degreasing agent 27 was returned to the reservoir tank 7.

The thus degreased and cleaned honeycomb core 25 was completely removed of contaminating mineral oils, and the vapor degreasing ensured the complete removal of the residual mineral oils from the honeycomb core 25. No residual mineral oil could be detected by ultraviolet inspection using ultraviolet radiation for detecting residual oils. The honeycomb core 25 could be dried satisfactorily and the normal paraffin degreasing agent was completely removed by drying at the reduced pressure at 100° C. for 4 minutes.

Figure 4:
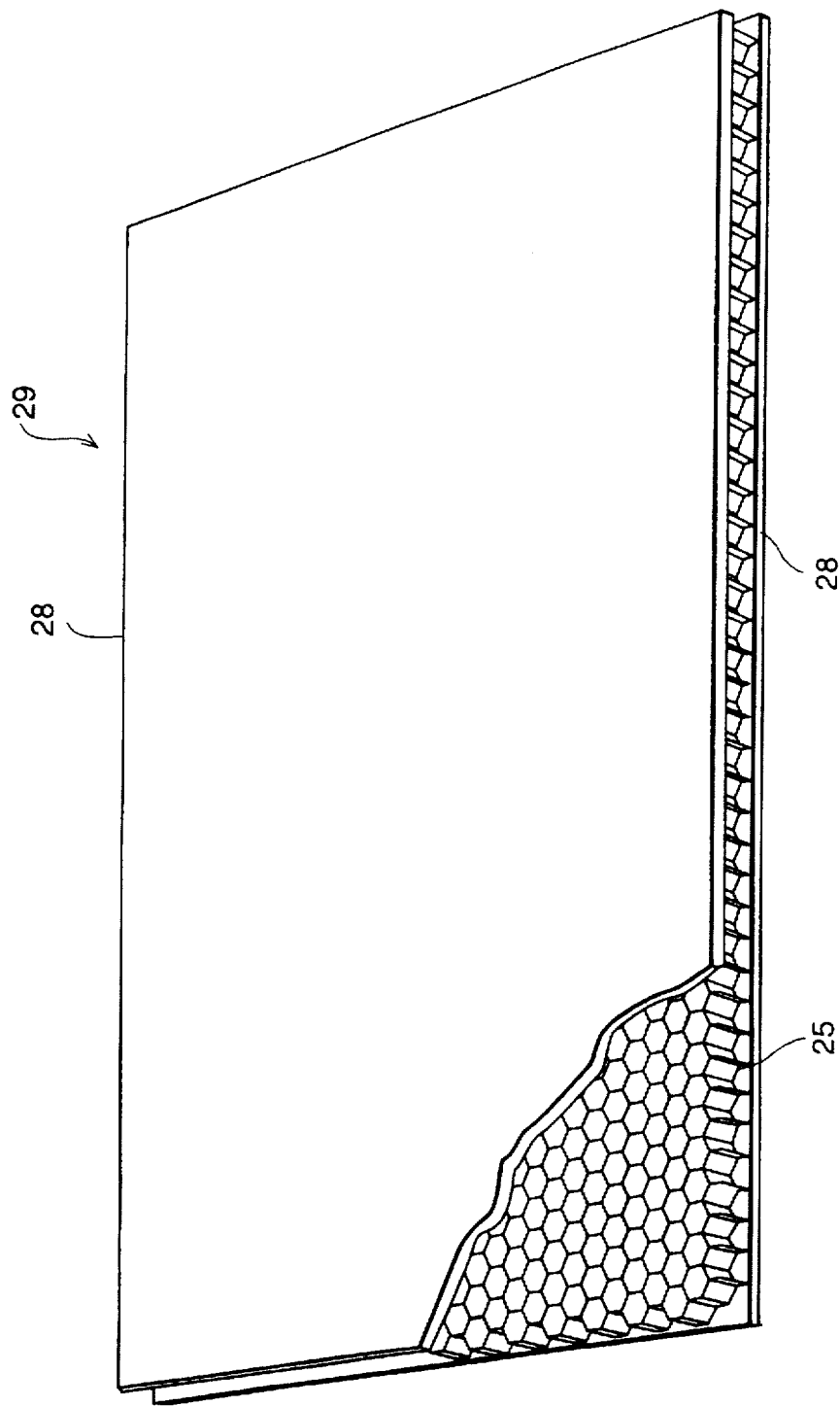
FIG. 4 is a partly broken perspective view of a honeycomb sandwich panel constructed by adhesively bonding aluminum alloy outer sheets to the opposite major surfaces of a degreased aluminum alloy honeycomb core having hexagonal cells.

Thermosetting epoxy adhesive films having a setting temperature of 250° F. were applied to the upper and the lower surface of the thus cleaned honeycomb core 27, and, as shown in FIG. 4, aluminum alloy outer sheets 28 were attached adhesively to the upper and the lower surface of the honeycomb core 25. Thereafter the assembly of the honeycomb core 25, the thermosetting adhesive films and the aluminum alloy outer sheets 28 was compressed and heated to complete a honeycomb sandwich panel 29. The honeycomb sandwich panel had a sufficiently high bond strength, sufficient durability of bonds and a high structural strength.

The honeycomb core degreasing method of the present invention is applicable also to degreasing various types of honeycomb cores including stainless steel honeycomb cores, titanium honeycomb cores, square cell type honeycomb cores, open cell type honeycomb cores and overexpanded type honeycomb cores.

The honeycomb core 25 may be of any cell size, provided that the degreasing agent sprayed by the upper shower nozzles 3 and the lower shower nozzles 4 is able to penetrate into the cells. Although full cone type nozzles are suitable for use as the upper shower nozzles 3 and the lower shower nozzles 4, the upper shower nozzles 3 and the lower shower nozzles 4 may be those that sprays the degreasing agent at a not very high spraying pressure as long as the liquid degreasing agent is able to wet the honeycomb core 25 thoroughly.

As is apparent from the foregoing description, the honeycomb core degreasing method of the present invention using a normal paraffin as a hydrocarbon degreasing agent and employing a vacuum spraying process and a vapor degreasing process is capable of perfectly degreasing honeycomb cores with a satisfactory cleanliness. Accordingly, a honeycomb sandwich panel constructed by adhesively bonding outer sheets to a honeycomb core degreased by the honeycomb core degreasing method of the present invention has sufficient bond strength, durability of bonds and a high structural strength.

Since the honeycomb core degreasing method of the present invention is carried out in a closed degreasing chamber, safety can be secured for the operator and the environment.

What is claimed is:

1. A honeycomb core degreasing method comprising the steps of:

placing a honeycomb core in a degreasing chamber;

closing the degreasing chamber;

evacuating the degreasing chamber to a vacuum in a range of 50 to 100 torr;

spraying upper and lower surfaces of the honeycomb core with a normal paraffin as a hydrocarbon cleaning agent heated at a temperature in a range of 60° to 120° C. for shower rinsing and finish shower rinsing;

adjusting an internal pressure of the degreasing chamber to a vacuum in a range of 30 to 40 torr;

supplying a vapor of the normal paraffin cleaning agent heated at a temperature in a range of 110° to 120° C. into the degreasing chamber for a vapor degreasing of the honeycomb core; and drying the honeycomb core in the degreasing chamber at a temperature in a range of 70° to 120° C. under a reduced pressure in a range of 0.1 to 10 torr.

* * * * *